United States Patent [19]

Levine

[11] Patent Number: 4,777,102

[45] Date of Patent: Oct. 11, 1988

[54] METHOD AND APPARATUS FOR ELECTRONIC DEVELOPMENT OF COLOR PHOTOGRAPHIC FILM

[76] Inventor: Alfred B. Levine, 2924 Terrace Dr., Chevy Chase, Md. 20815

[21] Appl. No.: 138,655

[22] Filed: Dec. 29, 1987

Related U.S. Application Data

[60] Continuation-in-part of Ser. No. 15,142, Feb. 17, 1987, Pat. No. 4,745,040, which is a division of Ser. No. 834,923, Feb. 28, 1986, Pat. No. 4,751,583, which is a continuation-in-part of Ser. No. 617,344, Jun. 4, 1984, Pat. No. 4,588,282.

[51] Int. Cl.[4] .............................................. G03C 11/00
[52] U.S. Cl. ..................................... 430/21; 430/346; 430/367; 430/394; 430/401; 369/284
[58] Field of Search ................. 430/21, 346, 394, 401, 430/367; 369/284

[56] References Cited

U.S. PATENT DOCUMENTS

4,085,327  4/1978  Swank et al. ................ 250/213 VT
4,366,235 12/1982  Land .................................. 430/322

FOREIGN PATENT DOCUMENTS

0002102  2/1978  European Pat. Off. .

OTHER PUBLICATIONS

Research Disclosure 21630, "Plural Imaging . . . ," pp. 120-122.

Primary Examiner—Paul R. Michl
Assistant Examiner—Patrick A. Doody

[57] ABSTRACT

A method for electronic "dry" development of latent images in conventional types of color photographic films comprising interrogating the film with a series of different color light beams, each corresponding in color frequency with a different color sensitivety of the film and each having a time-amplitude energy content that is sufficient to drive that latent color image in the film into a condition of saturation. Deriving from each of said different color interrogations an electrical signal, corresponding to the latent image in that color, and recording said electrical signals. An apparatus for performing said method comprises a portable, light tight enclosure, containing a series of different color interrogating light beam generating mechanism, light energy detectors, and electrical recorders.

20 Claims, 2 Drawing Sheets

METHOD AND APPARATUS FOR ELECTRONIC DEVELOPMENT OF COLOR PHOTOGRAPHIC FILM

RELATED APPLICATIONS AND PATENTS

This is a continuation-in-part of application Ser. No. 015,142, filed Feb. 17, 1987, now U.S. Pat. No. 4,745,040. Application Ser. No. 015,142 is, in turn, a division of application Ser. No. 834,923, filed Feb. 28, 1986, now U.S. Pat. No. 4,751,583, which is, in turn, a continuation-in-part of application Ser. No. 617,344, filed June 4, 1984, now U.S. Pat. No. 4,588,282.

BACKGROUND OF THE INVENTION

1. FIELD OF INVENTION

This invention generally relates to processes for electronic development of conventional photographic film, both black and white and color; and to apparatus for practising this process.

2. BACKGROUND

In earlier U.S. Pat. No. 4,751,583 and U.S. Pat. No. 4,745,040, there is provided apparatus for electronic development of photographic films, of types using light sensitive crystals, or other chemical compounds, that absorb light energy when exposed to a light image, to change chemical composition. The disclosed electronic development processes involve applying light energy of constant time-energy integral to incremental portions of the film to drive the light sensitive crvstals, or other compounds, into saturation, and electronically detect at each such incremental area the quanta of light that is not absorbed by the film. At each portion of the film storing a latent image from a previous exposure, the light energy being absorbed until reaching saturation varies according to the extent of prior exposure, whereby the latent image is detected and electronically reproduced from the variations in the interrogating light energy that are not absorbed by the film at the different positions.

SUMMARY OF THE INVENTION

According to the present invention, a similar process is employed for electronically developing, or reading out, a multi-color latent image that has been stored in an exposed conventional color photographic film. Briefly according to the invention, the film is scanned by a series of different color interrogating light beams, with each different color light beam being of a different frequency color closely corresponding to the different light frequency sensitively of a different color sensitive chemical compound in the film, and with each such different color interrogating light beam having only a sufficient time -energy integral sufficient to bring its color sensitive chemical compound in the film into a condition of saturation. The light energy from each different color interrogating beams, that is not absorbed by the film, as that beam scans the film frame, is electronically detected and electrically recorded. Therefore, each different color latent image in the color film is separately detected and recorded.

According to the invention, a preferred apparatus to perform this electronic development of the exposed film, is provided in the form of a small, portable, light tight, battery operated unit, that is similar in size and configuration to the audio portable playback units, presently in widespread use for playing audible recordings on compact discs. Within the unit is provided a light scanning mechanism, an electronic light detector, electrical signal recorders, and different color light filters, as required; all being in miniature size and low power capacity to be driven by a portable battery power source.

DETAILED DESCRIPTION OF PREFERRED EMBODIMENTS

Figure 1:
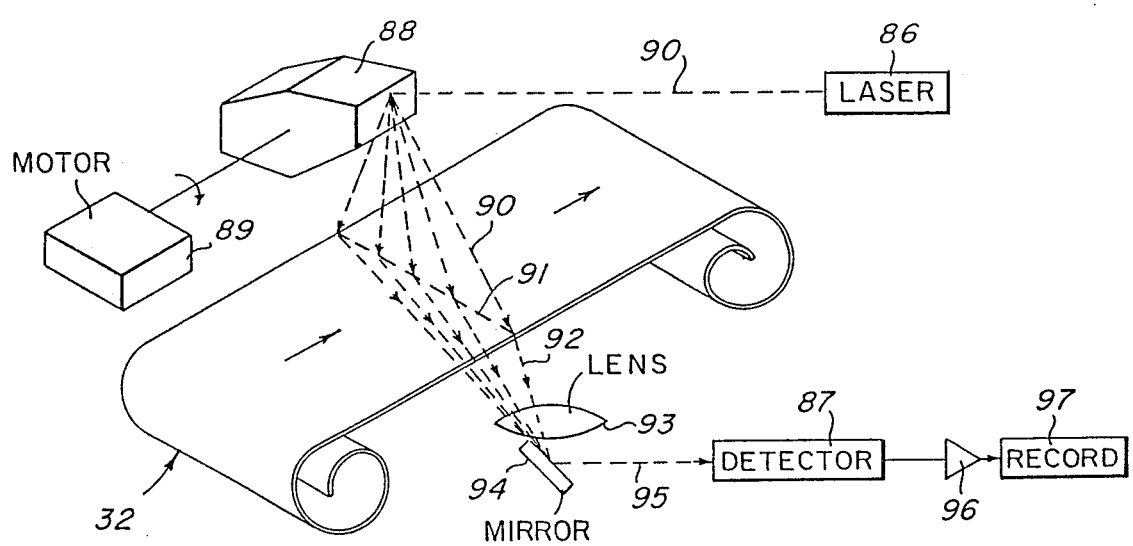
FIG. 1 is a perspective view illustrating a process and apparatus for electronic development of a conventional photographic film.

FIG. 1 illustrates an electro-optical method and apparatus for destructively reading out the latent images in an exposed but undeveloped photographic film, without the need for chemically processing the film, all as disclosed in earlier U.S. Pat. No. 4,745,040. As shown, a low intensity fine interrrogating laser beam 90, having light frequencies within the visible sensitive band of the film 32, is rapidly scanned in a series of lines forming a rectangular raster across the film 32, as the film 32 is advanced longitudinally. The intensity of the interrogating beam 90 taken with the speed of scanning the lines is adjusted to apply only sufficient light energy to each incremental area of the film 32 so as to expose the light sensitive silver halide crystals, or other light sensitive chemical compound, into a condition of saturation. However, the time-intensity integral of exposure is carefully controlled to be sufficiently low so as not to greatly exceed this saturation level. A lens system 93 and mirror 94 is properly located to receive the scanning light beam after its passage through the film 32, and collect and apply the received light to an electronic light sensor or detector 87, where the received light is converted into an electric signal and amplified at 96. After a sufficient level of amplification, the received signal is recorded by recorder 97 to provide a recorded elecrtrical image corresponding to the original latent image on the exposed but undeveloped photo film.

As each incremental position of the film frame 32 is scanned by the fine beam of interrogating light 90, a different quanta of energy is absorbed by the light sensitive silver halide crystals, or other light sensitive chemical compound, at that position of the film 32, adding to the previous exposure (by the original light image exposure), and driving the light sensitive crystals at that position into a condition of saturation. Where the previous exposure by the light image has been at a low level (dim), a greater quanta of light energy from the interrogating beam 90 is absorbed; whereas where the latent image at that position results from a greater exposure of light from the image, a lesser quanta of light energy is absorbed from the interrogating beam 90, to drive the crystals into saturation. Therefore the quantity of the interrogating light that passes through the film 32 to energize the detector 87 varies, as the beam is scanned over the film frame as the inverse (or positive) of the latent image, and the electrical signal being recorded in recorder 97 correspondingly varies according to the stored latent image in the film 32. It will be appreciated that the laser scanning speed is normally quite fast to provide an extremely short interrogating exposure of the film 32; and a highly sensitive light detector system 87, high gain amplifier 96 are required to reproduce the very low level variations in the scanning interrogating light beam 90, after its passage through the film 32.

The high speed scanning mechanism for very rapidly sweeping the laser beam 90 in a series of displaced lines 91 across the film 32 may comprise a multifaceted prism 88 driven by a high speed motor 89, as are now commonly used in high speed laser printers. After passing through the film 32, the reduced intensity laser beam 32 is collected by a lens system 93, parabolic mirror (not shown), or other optical collector, and focused onto a suitably disposed mirror 94 to be directed to the light sensitive electronic detector 87, as earlier described.

It will be appreciated that changes may be made in the scanning system for the interrogating light beam 90. The beam itself may be generated by a different source of light, other than a laser, and be controlled to generate light at constant intensity, and, by the use of suitable color filters, produce light energy at the light sensitive wavelenth of the light sensitive crystals, or other compound, in the film 32. The light beam 90 can be finally focused by the use of lenses or collectors or reflectors (not shown); and be scanned across the film frame 32 in a spiral pattern, or other pattern, other than the rectangular raster, as shown in FIG. 1. It will be appreciated that the finer the interrogating light beam 90, and the more sensitive the detector 87, the greater the number of pixels of the latent image that can be recovered from the film frame 32, and elecrically recorded by the recorder 97.

Figure 2:
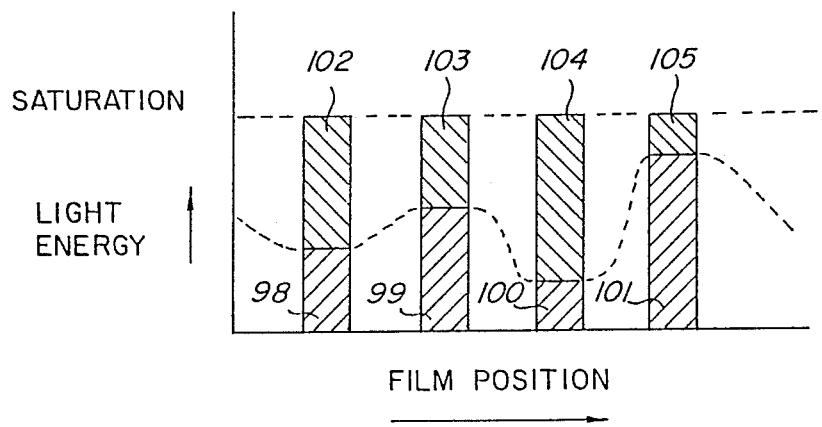
FIG. 2 is a schematic chart illustrating the variable light absorption in the photo film of the interrogating beam, according to the stored latent image from a previous exposure.

FIG. 2 is a simplified illustration showing the varying degree of absorption of the interrogating light beam 90 by the film frame 32, as the scanning interrogating beam 90 scans the series of different lines in the film frame 32. At a first incremental area of the film frame, shown at the left in FIG. 2, the quanta of light energy previously absorbed in forming the latent light image is represented by the region numbered 98. The remaining area above region 98, and indicated by the number 102, represents the additional quanta of energy that is absorbed by the light sensitive chemical compound at that area, that is necessary to drive the compound at that area into a condition of complete saturation. At the next position on the chart of FIG. 2, corresponding to the next adjacent area on the film frame 32, the initial light energy absorbed from the original light image, and stored as a latent image, is shown at region 99. This differs from the energy stored at 98, according to the variations in the original light image exposing the film 32. Consequently, a lesser quanta of light energy is absorbed from the interrogating light beam 90, in order to drive the light sensitive chemical compound at this position into a fully saturated condition; as illustrated by the region 103.

In a similar manner, each of the next two incrementally small areas on the film frame have absorbed different quantas of energy from the original exposure of the light image, as represented by the regions 100 and 101, shown in FIG. 2. Therefore as the interrogating light beam 90 passes each of these next two areas or regions, the quanta of light being absorbed by the film crystals at these two areas also varies inversely to that of the latent image, as represented in FIG. 2 by the areas numbered 104 and 105, respectively. Thus the quantity of light energy received by the light detector 87 as the film frame is progressively scanned by the interrogating light beam 90 varies in inverse proportion (positive) to that of the latent image previously stored in the film, and the recording of this varying signal of the complete film frame corresponds to the positive of the original latent image stored in the film.

It will be appreciated that this electronic optical readout of the latent image in the film frame 32 is destructive, in that the light sensitive chemical compounds in the film 32 are driven into a fully saturated condition by the interrogating light beam, thereby erasing the latent image in the film frame. The reading out of the film frame by the scanning interrogating beam is, of course, performed in a dark environment to prevent spurious exposure of the light sensitive film 32, or performed in an illuminated environment that is outside of the light sensitive frequency band of the film 32. For film of different light sensitivety (higher or lower ASA ratings), the scanning speed of the interrogating light beam 90 is correspondingly varied as is the longitudinal speed of driving the film 32, both to correspondingly change the time of exposure of the film to the interrogating light beam 90.

DEVELOPMENT OF COLOR FILM

Figure 3:
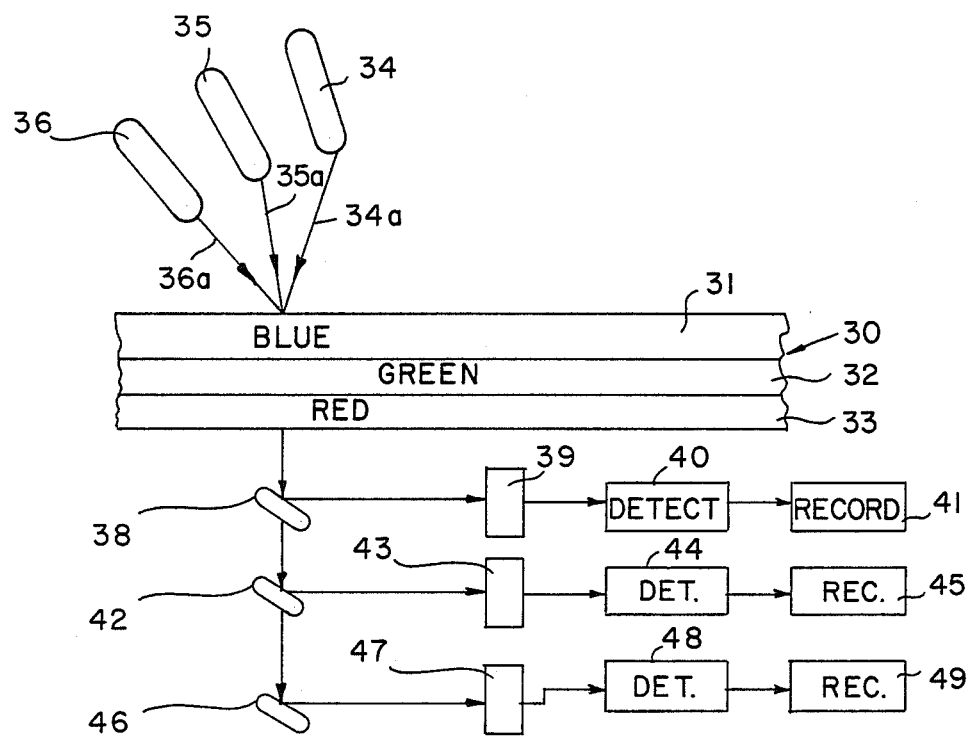
FIG. 3 is a schematic illustration showing the process applied to an exposed photographic color film.

A process for electronic development of exposed color film is similar to that disclosed above, and is shown in FIG. 3.

As shown, a conventional type of color film 30 is comprised of three light sensitive layers 31, 32, and 33, coated on top of one another in a tripack. The upper layer 31 is sensitive to blue light, and about one third of the visible light spectrum; the next layer 32 is sensitive to green, and about a second third of the visible light spectrum; and the third layer 33 is sensitive to the remaining third of the visible light spectrum, of red light. When the film 30 is exposed to a multicolored image, the blue portions of the image are absorbed and stored as a latent image in the blue layer 31. Similarly, the green portions are absorbed and stored in the green layer 32; and the red portions are absorbed and stored in the red layer 33.

For electronically developing each of these three different color latent images, according to the present invention, each different layer is scanned by a different color interrogating light beam within its frequency band of sensitively to bring about energy saturation of that layer by absorption, and the quanta of energy not absorbed by that layer is detected and electrically recorded, thereby to provide an electrical readout of its latent image. More specifically, as shown in FIG. 3, the blue sensitive layer 31 is scanned by an interrogating blue color beam 36c generated by a blue light generator 36; the green sensitive layer 32 is scanned by an interrogating green light beam 35a generated by a green light generator 35; and the red sensitive layer 33 of the film 30 is scanned by an interrogating red light beam 34a from a red light generator 34. Each of these different color interrogating light beams is of constant timeintensity energy integral, that is sufficient to drive its associated color sensitive layer into a condition of energy absorptive saturation, as described above. Therefore as each different color interrogating beam scans the film 30, a varying quanta of unabsorbed light from that beam passes through the film 30, in proportion to the stored latent image in the sensitive layer associated with that color beam. This unabsorbed light is detected by a photomultiplier light detector, or other highly sensitive opto-electrical detector, to generate a varying electrical signal corresponding to the latent image in that layer. This electrical signal is continuously recorded to provide an electrical recording corresponding to the latent image in that layer.

Elaborating further on the preferred process, the exposed film may be initially scanned by a constant intensity blue color light beam 36. As it interrogates each incremental area of the film 30, a varying quanta of light from this beam 36c is absorbed in the blue sensitive layer 31 that when added to the previous absorption by the latent image, drives that incremental portion into an energy absoptive condition. The unabsorbed quanta of light from the blue beam 36c passes through the film 30, is reflected by the mirror 38, and passes through a blue pass color filter 39 to the optical- electrical detector 40, generating a proportional electrical signal that is recorded by the electrical recorder 41. Thus as each incremental area of the film 30 is interrogated by the blue light beam 36c, a varying quanta of light is detected, according to the latent image stored at that area in the blue layer, and a corresponding electrical signal is generated and recorded. Upon completion of the interrogating of the entire latent image in the blue sensitive layer 31, an electrical image is recorded corresponding to the original latent image stored in the blue layer 31.

In the same manner, each of the other color sensitive layers 32 (green), and 33 (red) is progressively scanned by its associated interrogating light beams of corresponding color, to read out and electrically record the latent image stored in each one of the other layers. As shown in FIG. 3, there is provided a separate detector and recorder for each of the different color layers in the film 30, whereby three separate electrical images are recorded each corresponding to the latent image in a different one of the color sensitive layers 31, 32, and 33.

Specifically referring to FIG. 3, the green sensitive layer 32 is progressively scanned by the interrogating light beam 35a, and the unabsorbed light is reflected by mirror 42, and through green pass filter 43 to the detector 44 where the varying light energy is detected to generate a varying electical signal, and is progressively recorded at 45. Similarly, the red sensitive layer 33 is interrogated by the third beam 34a and the unabsorbed light is directed to the mirror 46, and through the filter 47 to detector 48 and recorder 49. Thus each of the three different color sensitive layers in the film 30 are progressively interrogated by a fine light beam of constant intensity and corresponding color, to read out the different color latent images stored therein, and the three different read out beams are separately detected and recorded as electrical images.

It will be appreciated by those skilled in the art, that the three different color light sensitive layers can be simultaneously interrogated by the three different color interrogating beams, instead of being successively scanned by the beams as discussed above. It will also be appreciated, that a single interrogating light souce and a single detector and recorder may be used to successively record the three different color latent images. This can be performed by successively scanning the film 30 through three different color light filters corresponding to the sensitivety of the three color layers 31, 32, and 33, and successively detecting the varying unabsorbed quanta of light during each such interrogating scan of the film, and recording the three resulting electrical images.

As discussed above, and in the earlier application referred to, this electronic read out of the latent images in the film destroys such images, since the light sensitive layers are driven into a condition of energy saturation by the interrogating light beams.

PORTABLE UNIT FOR ELECTRONIC FILM DEVELOPMENT

Figure 4:
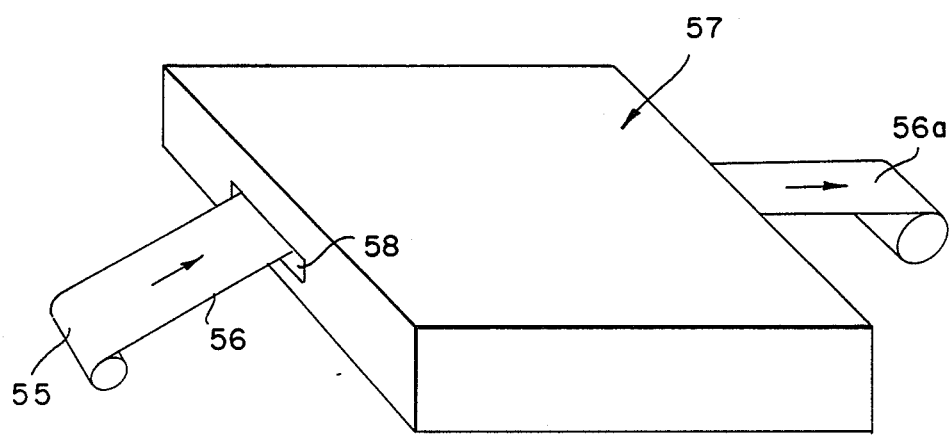
FIG. 4 is a perspective view illustrating a battery powered portable electronic developing apparatus, according to the invention.

A preferred apparatus for electronically developing the film 30 according to the described process employs a small, lightweight, portable developing apparatus 57, as is shown in FIG. 4, that need be not much larger in size than the photographic camera (not shown) for exposing the film 30. Such a small unit can be carried by the user to the situs where the photogaphs are taken, and electronically developed, as described, to provide electrical recordings of the images. Such electrical recordings can be viewed immediately, or later, or both, at the convenience of the user, to optically preview the images, using a portable visual electronic display, as disclosed in earlier copending applications.

Referring to FIG. 4, the portable unit 57 preferably is comprised of a small light tight enclosure 57, having an entry slot 58 at one end for receiving the leading edge of the light sensitive color film strip 56 from its light tight cartridge 55, and an outlet slot at the opposite edge for ejecting the spent film strip 56a after the latent images therein have been electrically recorded and erased from the film 56a. A light tight cover (not shown) may be used to enclose the film cartridge 55 and film strip 56, at the entry end, after the film strip has been threaded into the entry slot 58.

Inside of this portable developing unit 57, is provided the electro-optical components as shown in FIG. 1 or FIG. 3, including the interrogating light source or sources, color filters, motor driven scaning mechanism, light detectors, and electrical recorders, all as discussed above. All of these electro-optical components are presently available in miniatured, and lightweight sizes, such as are presently in use for audible playback of compact disc laser recordings. More specifically, the SONY CORPORATION of AMERICA has presently on the open market a battery powered laser beam compact disc player, occupying a volume that is little greater than that of a 35 mm camera, and having a weight of only a few pounds. This unit includes a precision scanning mechanism for directing the beam of a low power laser over the microscopically close tracks of a compact laser disc to read out the audio signal recorded therein. Since such device, and others, are presently commercially available, a further description of a similarly small, portable, scanning unit according to that shown in FIG. 1 and FIG. 3, is not believed to be necessary.

Since many changes made be made in the process and apparatus disclosed in the present application, without departing from the spirit and scope of the invention, this invention is to be considered as being limited only by the following claims.

What is claimed is:
1. A method of electronically developing a multicolor photographic film that has been previously exposed to store a multicolor latent image therein,
said multicolor film having three light sensitive layers including silver halide crystals each layer being light sensitive to a different one of the three primary colors blue, green, and red,
comprising the steps of:

scanning the film with a plurality of interrogating light beams, each being of a different color corresponding to the light sensitivety of a different layer of the film, each of the interrogating light beams having a time-intensity energy integral that is sufficient to drive its associated one of the light sensitive layers in the film into a condition of saturation by energy absorption, electro-optically detecting and electrically recording the unabsorbed quanta of light from each of the interrogating beams as it scans the film, thereby to provide three electrical recordings each corresponding to a latent image component in a different light sensitive layer of the film.

2. In the method of claim 1, said photographic film being scanned by the three interrogating light beams in time sequence.

3. In the method of claim 1, said photographic film being simultaneously scanned by the three interrogating beams.

4. In the method of claim 1, the time-intensity energy in the interrogating beams being adjustable according to the degree of light sensitivety of the photographic film.

5. In the method of claim 1, said interrogating beams being very fine light beams to maximize the number of incremental areas of the film that are scanned, detected, and electrically recorded.

6. In the method of claim 1, the detecting of the unabsorbed quanta of light from each of the interrogating beams being performed by passing the beam through the photographic film and detecting the light that is not absorbed by the film.

7. In the method of claim 1, the scanning of the film by the interrogating light beams being performed by rapidly deflecting the beams over the film in a rectangular raster.

8. A method of electronically developing a multicolor photographic film that has been previously exposed to a multicolor light image to store the primary colors of such image as separate component latent images therein, said film having plural light sensitive layers including silver halide crystal, each being light sensitive to a different one of the three primary colors of red, blue, and green, said method comprising the steps of:

scanning each different component latent image in the film by an interrogating light beam having a different color frequency corresponding to that of a different color component sensitively of the film, each of said interrogating light beams having a time-intensity energy integral during said scanning that is constant and sufficient to drive its corresponding light sensitive chemical composition into a condition of energy saturation by absorption of a varying portion of the interrogating light beam as the beams scans the film, continuously detecting the quanta of energy from each of the interrogating beams after it passes through the film during the scanning of the film, said detecting of energy from the each of the beams resulting in a varying electrical signal proportional to the stored latent image, and continuously recording said electrical signals.

9. In the method of claim 8, said interrogating light beams being generated by a single light source and employing different color filters each having a different color frequency corresponding to the color sensitively of a different color component of the film.

10. In the method of claim 8, the detecting of energy from each of the interrogating beams being performed by an electrooptical detector that responds to light energy to generate a corresponding electrical signal.

11. In the method of claim 8, the time-intensity energy integral in the interrogating beams being adjustable according to the degree of light sensitivety of the photographic film.

12. In the method of claim 8, said interrogating light beams being very fine light beams to maximize the number of incremental areas of the film that are scanned, detected, and electrically recorded, and the scanning of the film by the interrogating light beams being performed by rapidly deflecting the beams over the film in a rectangular raster.

13. In the method of claim 8, said interrogating beams being very fine light beams to interrogate very small incremental areas of the film, and the time-intensity energy integral of the interrogating beams being adjustable according to the light sensitivity of the film.

14. In the method of claim 8, the scanning of the film by the interrogating beams being performed by three interrogating beams each having a different color frequency corresponding to the different color sensitivities of the different chemical compounds, said interrogating beams being very fine light beams to maximize the number of incremental areas in the film that are interrogated, and the time-intensity energy integral of the interrogating beams being adjustable according to the light sensitivety of the film.

15. In the method of claim 8, the electronic development of the film being performed in a portable manner in the field at the situs of the exposure to the multicolor light image.

16. A system for electronic development of a multicolor photographic film that has been previously exposed to an image to store a multicolor latent image therein, said film having three light sensitive layers, each including silver halide crystals each being sensitive to a different one of the three primary colors red, green, and blue, comprising:

a first constant intensity interrogating light beams means for scanning the latent image in the red layer with a light frequency within the frequency band of sensitivety of the red layer;

a second constant intensity interrogating light beam means for scanning the latent image in the green layer with a light frequency within the frequency band of sensitivety of the green layer, a third constant intensity interrogating light beam means for scanning the latent image in the blue layer with a light frequency within the frequency band of sensitivety of the blue layer, each of said first, second, and third interrogating light beams having a time-intensity energy integral that is sufficient to impart absorptive light energy to its associated layer in the film that when added to the latent image stored therein drives that layer into an energy absorptive condition, optical-electrical detector means for separately detecting light from the interrogating beams that is not absorbed by each of the light sensitive layers during the scanning thereof, to generate three electical signals, and means for separately recording the three electrical signals to provide eletrical recordings corresponding to the originating three latent images in the film.

17. In the system of claim 16,
the time-intensity energy integral of the three interrogating beams being adjustable according to the light sensitivety of the film.

18. In the system of claim 16,
said interrogating light beam means, said optical-electrical detecting means, and said electrical recording means being small portable components that are combined in a small easily portable, light tight enclosure, thereby to enable the electronic development of the multicolor film to be performed in the field, at the situs where the film was exposed to the image.

19. In the system of claim 16,
said interrogating beam means each generating a very fine interrogating light beam to scan its associated latent image in the film, thereby to maximize the definition in the electrical recording of that image.

20. In the system of claim 16,
said interrogating light beams means generating very fine interrogating light beams to read out small incremental areas of the light images, and the time-intensity energy integral of the interrogating light beams being adjustable according to the light sensitivety of the photographic film.

* * * * *